United States Patent [19]

Zeller et al.

[11] 4,448,433
[45] May 15, 1984

[54] TOBOGGAN PLATFORM

[76] Inventors: Chris Zeller, 2403 County Rd. 203 #20; Jeff Ohmstedt, 23 La Plata Pl., both of, Durango, Colo. 81301

[21] Appl. No.: 370,045

[22] Filed: Apr. 20, 1982

[51] Int. Cl.³ .............................................. B62B 13/16
[52] U.S. Cl. .................................... 280/18; 280/12 A; 280/12 L; 280/20; 280/32.5; 296/20; 441/82
[58] Field of Search ................. 280/12 R, 12 A, 12 L, 280/12 F, 18, 19, 20, 24, 32.5, 289 A, 15, 203; 296/19, 20; 441/40, 80, 82, 83

[56] References Cited

U.S. PATENT DOCUMENTS

| | | | |
|---|---|---|---|
| 3,222,080 | 12/1965 | Kinraide | 280/18 |
| 3,740,065 | 6/1973 | Greene | 280/19 |
| 3,746,357 | 7/1973 | Haskins | 280/24 |
| 3,799,566 | 3/1974 | Thompson | 280/18 |
| 4,190,280 | 2/1980 | Donohoe | 296/20 |
| 4,389,066 | 6/1983 | Weir et al. | 280/24 |

Primary Examiner—David M. Mitchell

[57] ABSTRACT

The Toboggan Platform consists of a platform which may be connected to a snow toboggan on one side by means of a brace and two hinges. Opposite said hinges is a snow ski connected to said platform by bolts through said platform, two blocks and said ski. Atop said platform are: two knee braces connected to said platform by screws, an adjustable kicker plate communicating with said platform by two bolts through said plate having wing nuts on their top end and large washers on their opposite end, said kicker plate being adjustable by means of sliding said bolts through two slots in said platform, and a vertical support operably connected to said platform by means of a brace on one side, and two hinges having a common pin on the opposite side, enabling the removal of said vertical support.

1 Claim, 6 Drawing Figures

TOBOGGAN PLATFORM

Our invention relates to snow sleds, such as toboggans, and has for its primary object a platform, which attaches to a toboggan, enabling a rescuer to kneel on said platform and efficiently perform cardiopulmonary resuscitation and other first aid while closely monitoring a victim of severe trauma while being transported across snow in said toboggan.

Attempts have been made to provide a rescuer proximity to the victim by attaching two toboggans together, the rescuer being in one toboggan and the victim in the other; and some attempts have required the rescuer to straddle the victim in the same toboggan, but all such prior attempts of which we are aware do not provide for the proper positioning of the rescuer to perform effective cardiopulmonary resuscitation and require excessive manpower and equipment.

It is an object of our invention to provide a platform upon which rescuer is able to attain the most advantageous position, having feet and knees braced, and upper body maintainable in a somewhat verticle position, while in motion, regardless of the degree of slope or terrain obstacles, with hands free to render whatever first aid is deemed necessary to the victim.

Furthermore, to provide for rapid and efficient deployment to a victim of trauma. it is an object of our invention to allow the platform to be folded into the toboggan, resulting in minimum wear and tear on said platform, while maintaining normal tracking and gliding ability of said toboggan across snow.

It is also an object of our invention that it be easily and rapidly erected, adjusted and used in the most adverse weather conditions, with a minimum amount of manpower and modifications to the toboggan.

To these and other ends our invention resides in certain improvements and combinations of parts, all as will be hereinafter more fully described.

Figure 2:
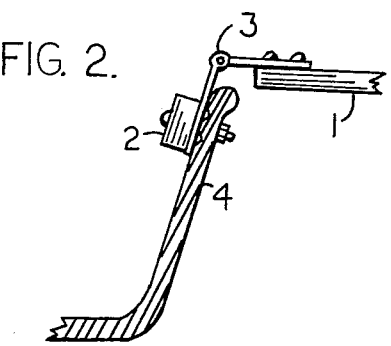
FIG. 2 is a front elevation of the front platform hinge arrangement.

The invention may be applied to a rescue toboggan 4 of well known construction by means of drilling three holes in the sidewall of said toboggan 4 to accomodate the hinge brace 2 which is bolted along its longitudinal axis to the said toboggan 4 through said holes. The three holes being the only modifications necessary to toboggan 4. Platform 1 is attached to hinge brace 2 by means of two hinges 3, as shown in FIG. 2. This arrangement allows the invention to move up or down over terrain obstacles while in use, and be folded into the toboggan 4 for rapid transport to the victim.

Figure 3:
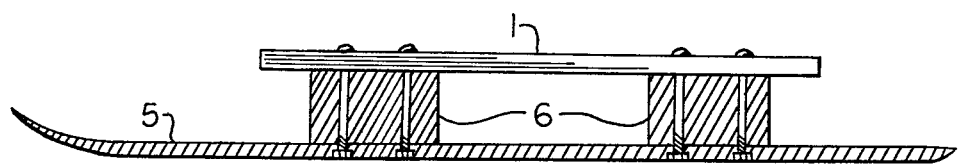
FIG. 3 is a sectional side elevation of the platform and its attachment to the ski taken on line 3—3 of FIG. 1.

The lateral or outside end of platform 1 is connected to two blocks 6 and a ski 5 by four bolts through each block 6 and ski 5, as shown in FIG. 3. Ski 5 enables outside end of platform 1 to slide easily across snow.

Figure 1:
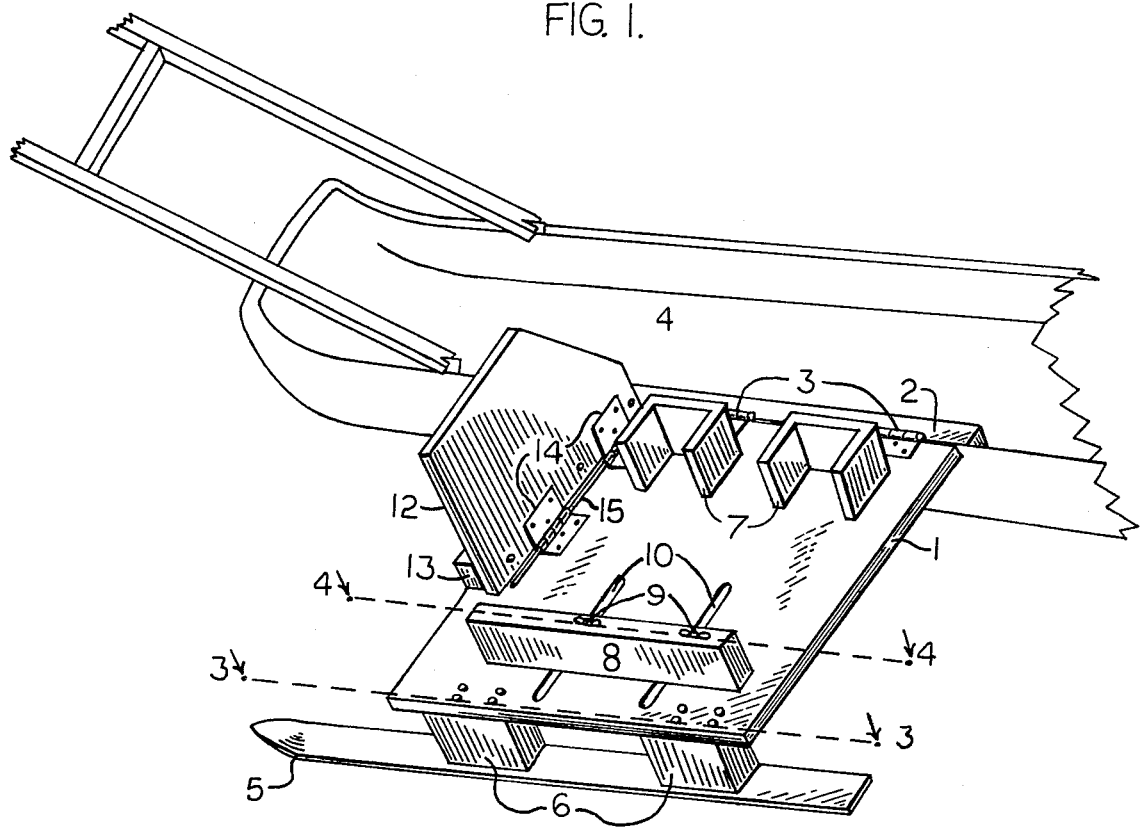
FIG. 1 represents, in perspective, the erected platform and its relation to the toboggan.
Figure 5:
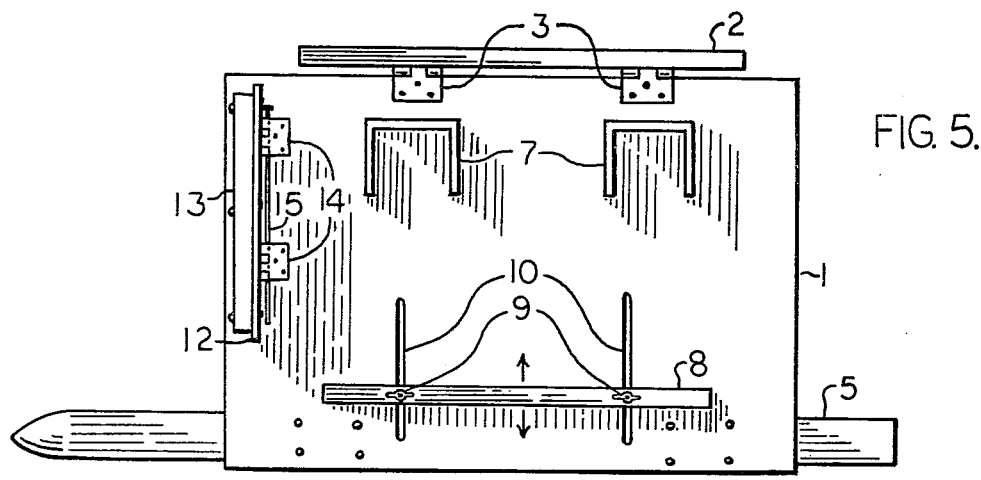
FIG. 5 is a plan view of the platform showing the kicker plate and its adjustment.

In FIGS. 1 and 5, knee braces 7 are connected by means of screws from underneath through platform 1. The inside of knee braces 7 may be padded with carpeting to protect the rescuer's knees.

Figure 4:
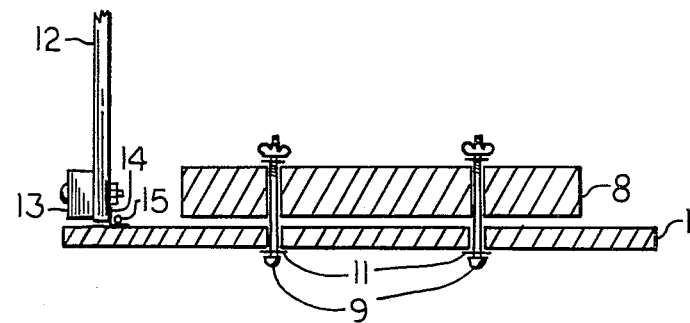
FIG. 4 is a sectional side elevation of the kicker plate taken on line 4—4 of FIG. 1.

As shown in FIG. 4, the kicker plate 8 is attached to platform 1 by means of two bolts 9 running vertically through kicker plate 8 and slots 10 in platform 1. The bottoms of bolts 9 are secured to platform 1 by a large washer 11 on each bolt, whose diameter is larger than the width of each slot 10. The tops of bolts 9 having small washers and wing nuts which facilitate the loosening and tightening of bolts 9.

Figure 6:
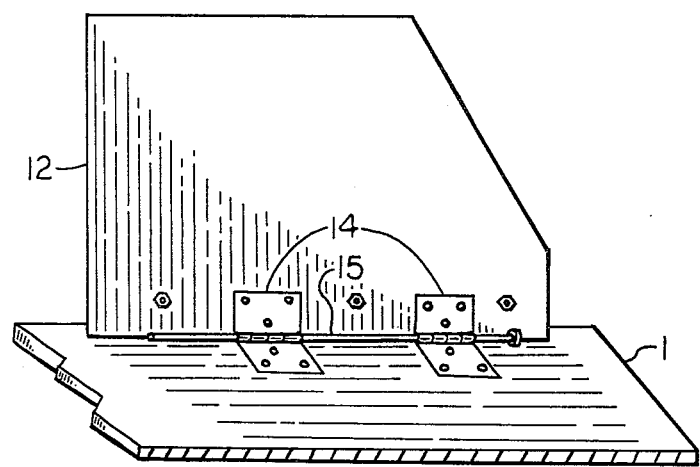
FIG. 6 is an enlarged side elevation of the verticle support showing the interior hinge with the platform broken away.

The rescuer kneels on platform 1 with knees secured in knee braces 7. Wing nuts on tops of bolts 9 are loosened. The kicker plate 8 is then moved forward or backward along platform, as indicated by arrows in FIG. 5 until it is snug against the bottoms of rescuer's feet, then wing nuts on bolts 9 are tightened, thus securing the legs of the rescuer. The verticle support 12, as shown in FIGS. 1, 4, 5, and 6, is designed to support the rescuer's midsection and aid in maintaining his balance while traveling down terrain of a steep slope. The verticle support 12 is attached to platform 1 by means of two hinges 14, each hinge 14 having one of its halves attached to the verticle support 12 and its other half attached to the platform 1, and having as a common pin a length of rod 15 running through both hinges 14 connecting the verticle support 12 to platform 1, as shown in FIG. 6. Rod 15 can be removed so that verticle support 12 can be detached from platform 1. With verticle support 12 detached, platform 1 can be folded over into toboggan 4. The upper inside edge of verticle support 12 is cut away at an angle to allow the rescuers' arms easy access to the victim.

The verticle support brace 13, as shown in FIGS. 1, 4, and 5, is designed to counterbalance the verticle support 12 against the weight of the rescuers' midsection and maintain the verticle support 12 in a verticle position relative to the platform 1, never allowing the rescuer to topple over. The verticle support brace 13 is attached to the verticle support 12 by means of three bolts through verticle support 12 and verticle support brace 13 as shown in FIG. 6.

Thus, a stable, sturdy platform is provided upon which a rescuer may securely kneel, having his midsection supported and hands free to attend to the needs of a victim of trauma who is lying at the rescuers side in the attached toboggan, said platform being of a simple construction which is easily and quickly assembled and disassembled.

We claim as our invention:

1. A platform having on one side hinges and a brace for means of attachment of said platform to a snow toboggan and for means of folding said platform into said toboggan, a snow ski communicating with said platform opposite said hinges for means of gliding same across snow, an adjustable foot brace and knee braces mounted atop said platform for means of supporting a rescuers' lower body while kneeling atop said platform, a verticle support for means of maintaining in a somewhat verticle position the midsection of said rescuer, operably connected atop said platform to enable said verticle support to be removeable from said platform to facilitate the folding of said platform into said toboggan.

* * * * *